Patented Dec. 19, 1939

2,183,553

UNITED STATES PATENT OFFICE 2,183,553

METHOD OF TESTING TUBERS FOR VIRUS INFECTION

Franz Erich Eidmann, Eberswalde, near Berlin, Germany

No Drawing. Application January 23, 1939, Serial No. 252,508. In Germany January 28, 1938

6 Claims. (Cl. 23—230)

This invention relates to a method of determining the presence or absence of certain virus-infections of tubers, such as potatoes.

It is a particular object to enable potato-growers to improve their seed-stock and to avoid the planting and propagation of infected crops, by providing a simple, convenient, and positive means for distinguishing and segregating sound from infected potato-seedlings.

Other objects will become apparent from the disclosures hereinafter.

Potato cultivation is constantly menaced by disease symptoms which result in a progressive crop reduction. The principal causes for these symptoms have been found to be due to virus infections whose presence in an infected tuber cannot be detected directly by either microscopic, bacteriological, biochemical, or other similar methods hitherto employed. The presence of such infection can only be accurately ascertained after the plant has developed from the seed-potato. Since it is, therefore, impossible to eliminate infected seedlings from propagation, the dissemination of these diseases with their harmful economic consequences could not be successfully arrested.

Various methods have been suggested for the determination of healthy and infected seedlings. For instance, it has been attempted to produce leaf diseases, that might furnish a clue for any possibly existent infection, by rubbing the leaves of young tobacco plants with the juice of potato tubers to be examined. It has further been attempted to demonstrate the presence of these wasting disease symptoms by determining the so-called oxidation-reduction potential. Biochemical methods have also been resorted to, as for instance the varied coloration of the meat of the tubers, to distinguish between healthy and diseased tubers after contact with clean copper foil; also by observing the varying speed of decoloration of easily reducible dye-solutions like methylene blue, guaiac-blue, and the like, as indicating a variation in respiratory intensity.

None of these methods has proved to be useful in practice, since they all are either inaccurate, or, as for instance the electro-metrical method, too cumbersome, time-consuming, and expensive.

In contrast thereto, it is possible by the process of the instant application, to determine the health status of potato tubers in a short time and with hitherto unattained accuracy, while yet entailing relatively little labor and expense.

The applicant has now found that when slices of healthy and diseased tubers are immersed in a solution of selenium compounds, especially salts of selenious acid, these compounds will, within a short time, be reduced to clear red selenium in the tissue of the tubers. The differences which may be noted in the speed and intensity of the red coloration in themselves already permit certain deductions as to state of health of the tubers. By permitting the slices to remain in the solution protractedly, according to a preferred method of the process, it will now be found that after a certain length of time the red selenium changes to a grey modification in the infected tubers, whereas the healthy slices will retain their red color even after prolonged immersion in the solution.

This unexpected phenomenon is of particular advantage in the practice of the instant invention, as compared with all other methods, in that the red or grey coloration, obtained after completion of the test, depending upon the health state of the tuber, is stable. The treated slicings can subsequently be transferred to a suitable preserving agent so as to serve as proof of the result of the test. The correctness and reliability of this method of determining the health condition has been demonstrated by extensive comparative tests through the plantation of seedlings that had previously been tested by the above process.

By way of example, the instant process can be carried out as follows: A 2% aqueous solution of acid sodium selenite is prepared. From the tubers to be tested, slices of a thickness of about 3–4 mm. are cut longitudinally from stem to bud-end and immersed in the solution which is then placed in a heating cabinet, having a constant temperature of about 30° C. Thereupon the time when the red coloration ceases to progress is determined by observation. This is usually the case after about 3 hours. Thereafter the test slices are left in the solution for a further prolonged period under the same conditions. Usually after about 20 to 24 hours the diseased slices begin changing their color to grey and reach their ultimate grey color after about 36 hours. In contrast, the healthy potatoes retain their red coloration even after a period of 8 days. After completion of the reaction, the test slices are placed in alcohol for dehydration and preservation.

With the determination at hand, the infected seedlings are then segregated from the sound ones, according to the color-reactions as indicated Obviously certain modifications in various steps of the process herein disclosed, and as to their adaptation for the general purposes indicated, may be made without departing from the spirit and scope of the invention.

I claim:

1. A method of testing and segregating diseased from sound tuber-seedlings which comprises the steps of steeping longitudinal slices from the body of the tuber, immersing the same in an aqueous solution of a salt of selenious acid at least until a maximum red coloration is attained, noting the difference in coloration of the different specimens, further subjecting the slicings to the action of the solution to note further differentiation in color reaction, and then identifying and separating the specimens showing a grey discoloration from those retaining the original red coloration.

2. A method of testing and segregating diseased from sound tuber-seedlings which comprises the steps of steeping longitudinal slices from the body of the tuber, immersing the same in an aqueous solution of sodium selenite at least until a maximum red coloration is attained, noting the difference in coloration of the different specimens, further subjecting the slicings to the action of the solution to note further differentiation in color reaction, and then identifying and separating the specimens showing a grey discoloration from those retaining the original red coloration.

3. A method of testing and segregating diseased from sound tuber-seedlings which comprises the steps of steeping longitudinal slices from the body of the tuber, immersing the same in an aqueous solution of 2% sodium selenite at least until a maximum red coloration is attained, noting the difference in coloration of the different specimens, further subjecting the slicings to the action of the solution to note further differentiation in color reaction, and then identifying and separating the specimens showing a grey discoloration from those retaining the original red coloration.

4. A method of testing and segregating diseased from sound tuber-seedlings which comprises the steps of steeping longitudinal slices from the body of the tuber, immersing the same in an aqueous solution of a salt of selenious acid for a period of from 20 to 36 hours, until a maximum red coloration is attained, noting the difference in coloration of the different specimens, further subjecting the slicings to the action of the solution to note further differentiation in color reaction, and then identifying and separating the specimens showing a grey discoloration from those retaining the original red coloration.

5. A method of testing and segregating diseased from sound tuber-seedlings which comprises the steps of steeping longitudinal slices from the body of the tuber, immersing the same in an aqueous solution of a salt of selenious acid for a period of from 20 to 36 hours, until a maximum red coloration is attained, keeping the temperature at 30° C., noting the difference in coloration of the different specimens, further subjecting the slicings to the action of the solution to note further differentiation in color reaction, and then identifying and separating the specimens showing a grey discoloration from those retaining the original red coloration.

6. In a method of testing and segregating diseased from sound tuber-seedlings, the step which comprises subjecting a slice from the body of the tuber to the action of an aqueous solution of a salt of selenious acid at least until a maximum red coloration is attained.

FRANZ ERICH EIDMANN.